US011336818B2

(12) United States Patent
Wu et al.

(10) Patent No.: US 11,336,818 B2
(45) Date of Patent: May 17, 2022

(54) METHOD AND APPARATUS FOR CONTROLLING CAMERA, DEVICE AND STORAGE MEDIUM

(71) Applicant: BEIJING XIAOMI MOBILE SOFTWARE CO., LTD., Beijing (CN)

(72) Inventors: Jun Wu, Beijing (CN); Yuelin Wu, Beijing (CN); Qian Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 4 days.

(21) Appl. No.: 16/699,462

(22) Filed: Nov. 29, 2019

(65) Prior Publication Data
US 2020/0404164 A1    Dec. 24, 2020

(30) Foreign Application Priority Data

Jun. 19, 2019    (CN) .......................... 201910531271.2

(51) Int. Cl.
*H04N 5/232*    (2006.01)
*G06F 3/01*    (2006.01)
*H04M 1/02*    (2006.01)

(52) U.S. Cl.
CPC ......... *H04N 5/23219* (2013.01); *G06F 3/013* (2013.01); *H04M 1/0264* (2013.01); *H04M 2250/52* (2013.01)

(58) Field of Classification Search
None
See application file for complete search history.

(56) References Cited

U.S. PATENT DOCUMENTS

| 10,721,394 B1* | 7/2020 | Korrapati | ........... H04N 5/23219 |
| 10,970,895 B1* | 4/2021 | Knas | ..................... G06F 3/0481 |
| 2007/0086764 A1* | 4/2007 | Konicek | ................ H04N 5/232 396/56 |

(Continued)

FOREIGN PATENT DOCUMENTS

| CN | 101291364 B | 4/2011 |
| CN | 105844128 A | 8/2016 |

(Continued)

OTHER PUBLICATIONS

Extended European Search Report issued to EP Application No. 19214097.8 dated Mar. 10, 2020, (9p).

(Continued)

*Primary Examiner* — Rebecca A Volentine
(74) *Attorney, Agent, or Firm* — Arch & Lake LLP

(57) ABSTRACT

A method of controlling a camera is provided, the method being applicable to a terminal device, the terminal device including a Dynamic Vision Sensor (DVS) collecting circuit, and the method includes: obtaining event data collected by the DVS collecting circuit, while the terminal device performs photographing with a camera component in the terminal device; identifying an action of a designated face region of a control object within a collection range of the DVS collecting circuit according to the event data; and upon identification of a target action of the designated face region, controlling the camera component to perform a target operation corresponding to the target action.

18 Claims, 5 Drawing Sheets

(56) References Cited

U.S. PATENT DOCUMENTS

| | | | | |
|---|---|---|---|---|
| 2009/0066803 A1* | 3/2009 | Miyata | ............... | H04N 5/232<br>348/222.1 |
| 2010/0254609 A1* | 10/2010 | Chen | ............... | G06K 9/00221<br>382/195 |
| 2011/0205379 A1* | 8/2011 | Konicek | ............... | H04N 5/23219<br>348/211.1 |
| 2015/0145777 A1* | 5/2015 | He | ............... | G06F 3/0325<br>345/158 |
| 2015/0234472 A1* | 8/2015 | Park | ............... | G06F 3/0304<br>345/175 |
| 2016/0366332 A1* | 12/2016 | Gao | ............... | H04N 5/23219 |
| 2017/0060251 A1* | 3/2017 | Choi | ............... | G06K 9/00288 |
| 2019/0011805 A1* | 1/2019 | Ota | ............... | H04N 5/23219 |
| 2019/0320112 A1* | 10/2019 | Yu | ............... | H04N 5/23219 |
| 2020/0103967 A1* | 4/2020 | Bar-Zeev | ............... | G06F 3/04842 |

FOREIGN PATENT DOCUMENTS

| | | |
|---|---|---|
| CN | 105980976 A | 9/2016 |
| CN | 106303193 A | 1/2017 |
| CN | 106716441 A | 5/2017 |
| CN | 106959761 A | 7/2017 |
| CN | 106973222 A | 7/2017 |
| CN | 108513074 A | 9/2018 |
| CN | 108881724 A | 11/2018 |

OTHER PUBLICATIONS

Second Office Action of the Chinese application No. 201910531271. 2, dated Jan. 12, 2022 with English translation,(19p).

* cited by examiner

METHOD AND APPARATUS FOR CONTROLLING CAMERA, DEVICE AND STORAGE MEDIUM

CROSS REFERENCE TO RELATED APPLICATION

This application claims priority to Chinese Patent Application No. 201910531271.2 filed on Jun. 19, 2019, the entire content of which is incorporated herein by reference for all purposes.

FIELD

The present disclosure relates to the field of control technology, and in particular to a method for controlling a camera, a terminal device and a storage medium.

BACKGROUND

With the development of science and technology, terminal devices have become an indispensable part of people's life, work and study. Terminal devices with photographing functions gradually replace most photographing devices other than a few of professional Single Lens Reflex (SLR) Cameras, and photographing experiences become more and more important for a user when using the terminal devices. At present, a camera of the terminal device is operated by touching a screen of the terminal device by a user, to achieve operations such as focusing, photographing and zooming. Such touch operations are inconvenient in many cases. For example, to select a suitable photographing angle, sometimes it is inconvenient to touch the screen due to a pose of holding a mobile phone (e.g., an example of the terminal device), for example, in a scenario of taking a selfie by stretching an arm. For another example, it is inconvenient to control the screen with a wet hand. Therefore, when a terminal device performs photographing, a control manner is single, and existing artificial intelligence cannot satisfy user requirements as well.

SUMMARY

The present disclosure provides a method for controlling a camera, a terminal device and a storage medium.

According to a first aspect of the present disclosure, there is provided a method of controlling a camera, the method being applicable to a terminal device, the terminal device including a Dynamic Vision Sensor (DVS) collecting circuit, and the method includes: obtaining event data collected by the DVS collecting circuit, while the terminal device performs photographing with a camera component in the terminal device; identifying an action of a designated face region of a control object within a collection range of the DVS collecting circuit according to the event data; and upon identification of a target action of the designated face region, controlling the camera component to perform a target operation corresponding to the target action.

According to a second aspect of the present disclosure, there is provided a terminal device including a DVS collecting circuit, one or more processors, a memory configured to store instructions executable by the processors, where, upon execution of the instructions, the one or more processors are configured to: obtain event data collected by the DVS collecting circuit, while the terminal device performs photographing with a camera component in the terminal device; identify an action of a designated face region of a control object within a collection range of the DVS collecting circuit according to the event data; and upon identification of a target action of the designated face region, control the camera component to perform a target operation corresponding to the target action.

According to a third aspect of the present disclosure, a non-transitory computer readable storage medium storing instructions therein is provided, where, when the instructions are executed by one or more processors, the instructions cause the processors to: obtain event data collected by a DVS collecting circuit of a terminal device, while the terminal device performs photographing with a camera component in the terminal device; identify an action of a designated face region of a control object within a collection range of the DVS collecting circuit according to the event data; and upon identification of a target action of the designated face region, control the camera component to perform a target operation corresponding to the target action.

It is to be understood that the above general descriptions and the below detailed descriptions are merely exemplary and explanatory, and are not intended to limit the present disclosure.

BRIEF DESCRIPTION OF DRAWINGS

The accompanying drawings, which are incorporated in and constitute a part of the present description, illustrate examples consistent with the present disclosure and serve to explain the principles of the present disclosure together with the description.

DETAILED DESCRIPTION

Figure 1:
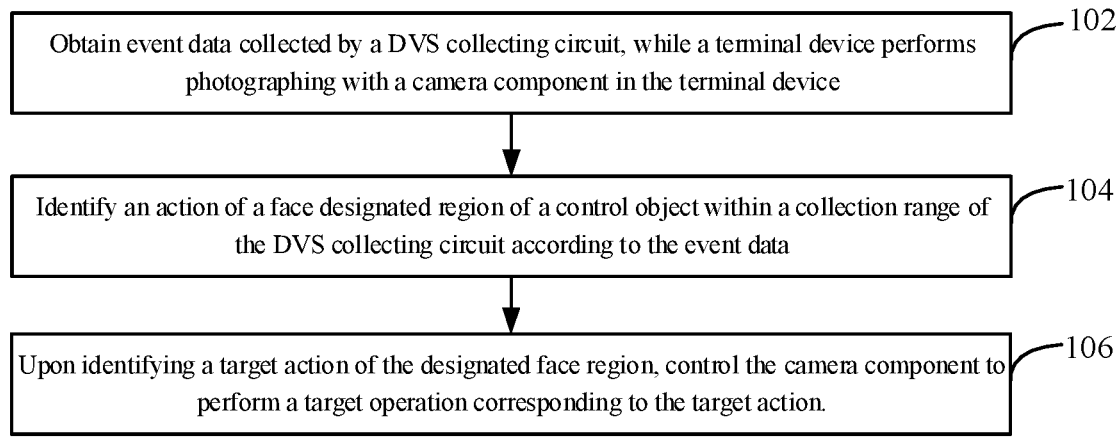
FIG. 1 is a flowchart illustrating a method of controlling a camera according to an example of the present disclosure.

Examples will be described in detail herein with the illustrations thereof expressed in the drawings. When the following descriptions involve the drawings, like numerals in different drawings represent like or similar elements unless stated otherwise. The implementations described in the following examples do not represent all implementations consistent with the present disclosure. On the contrary, they are merely examples of an apparatus and a method consistent with some aspects of the present disclosure.

The terms used in the present disclosure are for the purpose of describing a particular example only, and are not intended to limit the present disclosure. The singular forms such as "a," 'said," and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as "first," "second," "third," etc. in the present disclosure, the information should not be limited to these terms. These terms are used only to distinguish the same type of information from one another. For example, the first information may also be referred to as the second information without departing from the scope of the present disclosure, and similarly, the second information may also be referred to as the first information. Depending on the context, the word "if" as used herein may be interpreted as "when" or "as" or "in response to determining."

With widespread use of intelligent terminals, more and more people are inseparable from terminal devices such as mobile phones and tablet computers. Interaction between terminal devices and users becomes a developing focus of major terminal manufacturers, and thus there emerge various types of technical solutions for realizing operation interaction between users and terminal devices. For a terminal device with a photographing function, there may be a case that a screen is not conveniently operated due to some special scenarios or an excessively large size of the screen. For example, to select a suitable photographing angle, it is inconvenient to touch the screen due to a pose of holding a mobile phone sometimes, for example, in a scenario of taking a selfie (self-photographing) by stretching an arm. For another example, it is required to maintain stability of the terminal device when photographing, and touching the screen with a hand will inevitably result in slight shake of the terminal device, thereby affecting an imaging effect. For still another example, it is inconvenient to control the screen with a wet hand or a dirty hand, and the like.

In view of this, an example of the present disclosure provides a method for controlling a camera. When a terminal device performs photographing with a camera component (i.e., the terminal device is activated or enabled to perform photographing), event data collected by a DVS collecting circuit is obtained, and an action of a designated face region within a collection range of the DVS collecting circuit is identified according to the event data. Upon identification of a target action of the designated face region, the camera component is controlled to perform a target operation corresponding to the target action, so that the camera component may be controlled without manual operations. Further, since the event data includes data of pixel units of which a detected light intensity is changed without including data of all pixel units, a data volume is low and a response speed is high.

The method of controlling a camera according to examples may be performed by software, or may also be implemented by a combination of software and hardware or by hardware. The involved hardware may be formed by two or more physical entities, or may also be formed by one physical entity. The method according to the examples may be applied to an electronic device having a DVS collecting circuit. The electronic device may be a portable device with a photographing function, such as a smart phone, a smart learning machine, a tablet computer, a laptop computer and a Personal Digital Assistant (PDA), or may also be a fixed device, such as a desktop computer, or may also be a photographing device with photographing as its main function.

Descriptions are made with a smart phone as an example. An execution subject of examples of the present disclosure may be a smart phone, or may also be a camera application installed in the smart phone, or the like. It is to be noted that the smart phone is only one of the application examples according to the present disclosure, and it is not to be understood that the technical solutions according to examples of the present disclosure can only be applied to a scenario of the smart phone.

A Dynamic Vision Sensor (DVS), which may also be referred to as a dynamic event sensor, is a biomimetic vision sensor simulating human retina based on a pulse-triggered neuron. A pixel unit array formed by a plurality of pixel units is in the DVS, where each pixel unit responds and records a region where a light intensity rapidly changes when sensing the change of the light intensity. A specific composition of the dynamic vision sensor is not described herein. The DVS may output an asynchronous event data flow by adopting an event-triggered processing mechanism. The event data flow may be event data of successive moments. The event data may include light intensity change information (such as a time stamp of the light intensity change and a light intensity value) and a coordinate position of a triggered pixel unit, and the like. The response speed of the DVS is no longer limited by traditional exposure time and a frame rate of vision sensors, and thus may detect a high-speed object moving at a rate up to 10,000 frames per second; the DVS has a larger dynamic range, and can accurately sense and output event data under a low illumination or high exposure environment; the DVS has lower power consumption; since each pixel unit of the DVS can independently respond to the change of the light intensity, the DVS is not affected by a motion blur.

The examples of the present disclosure will be illustrated below in combination with accompanying drawings.

FIG. 1 is a flowchart illustrating a method of controlling a camera according to an example of the present disclosure. As shown in FIG. 1, the method may be applied to a terminal device, the terminal device includes a DVS collecting circuit, and the DVS collecting circuit may be a camera component based on a DVS. The method may include the following steps 102-106.

At step 102, while the terminal device performs photographing with the camera component of the terminal device, event data collected by the DVS collecting circuit is obtained. For example, the terminal device may perform photographing with the camera component at the same time as the terminal device obtains event data collected by the DVS collecting circuit.

At step 104, an action of a designated face region of a control object within a collection range of the DVS collecting circuit is identified according to the event data.

At step 106, upon identifying a target action of the designated face region, the camera component is controlled to perform a target operation corresponding to the target action.

Figure 2:
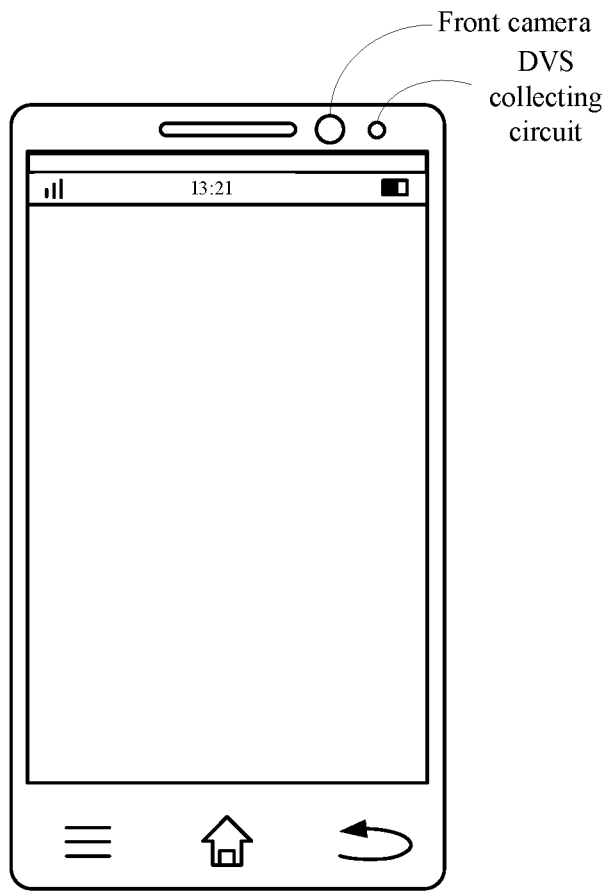
FIG. 2 is a schematic diagram illustrating a position of a camera component according to an example of the present disclosure.

The method according to the example may be applied to a terminal device. The terminal device is provided with a collecting module based on a Dynamic Vision sensor (DVS), which is referred to as a DVS collecting circuit. The DVS collecting circuit may be disposed at an outer surface of the terminal device to collect event data from an environment where the terminal device is located. For example, the DVS collecting circuit may be disposed on a front surface or a rear surface of the terminal device. In some scenarios, the control object (a controller) usually controls a camera according to a view-finding content displayed on a screen. Therefore, in an example, the DVS collecting circuit is disposed on a surface where the screen of the terminal device is located. For example, the DVS collecting circuit may be disposed in a surrounding region of a front camera. The DVS collecting circuit may also be disposed at other positions. FIG. 2 is a schematic diagram illustrating a position of a camera component according to an example of the present disclosure. In FIG. 2, the smart phone is taken as the terminal device, and the DVS collecting circuit is disposed at the right side of the front camera of the smart phone. The present example may be applied to a self-photographing scenario, or may also be applied to a scenario of photographing other people or sceneries.

The DVS collecting circuit collects the event data in the scenario, and may output an event when the scenario changes. For example, when no object moves relative to the terminal device in the scenario, the detected light intensity of the pixel unit in the DVS collecting circuit does not change. When it is detected that an object in the scenario moves relative to the terminal device, the light intensity is changed and thus a pixel event is triggered and an event data flow in which the detected light intensity of the pixel unit is changed is output. Each piece of event data in the event data flow may include a coordinate position of a pixel unit of which a detected brightness is changed, time stamp information of a moment at which the pixel event is triggered, a light intensity value, and the like. When a detected light intensity of a single pixel point in the DVS collecting circuit is changed, an event (pulse) signal is output. For example, if an increased brightness is beyond a threshold, an event which represents that the brightness of the pixel is increased is output. The event data corresponding to the same time stamp information may be displayed in an image form, and thus may be referred to as DVS image data. The DVS image data may be considered as partial image data. If the detected light intensity of the pixel unit is unchanged, there is no event data.

The terminal device performs photographing with the camera component, and the content displayed in a view-finding frame of the screen of the terminal device may be an image captured by the camera component. The camera component may be a photographing module for a user to perform photographing, or may be the DVS collecting circuit or other photographing modules in the terminal device. In a scenario of performing photographing with the DVS collecting circuit, the camera component may be the DVS collecting circuit. In a scenario where the DVS collecting circuit of the terminal device is taken as an auxiliary photographing module and another photographing module is taken as a main photographing module for photographing, the camera component may be the other photographing module in the terminal device, for example, an ordinary front camera or an ordinary rear camera is taken as the main photographing module.

A condition of obtaining the event data collected by DVS collecting circuit may be that it is detected that the camera component is in a running state or in an operating state. In other words, the condition may be that it is detected that the camera component of the terminal is photographing. When the camera component is running, the event data collected by the DVS collecting circuit may be obtained. A starting time of obtaining the event data may be a time of detecting the camera component is started or a time of receiving a start instruction for starting a control service of the camera component, or the like.

The camera component may be controlled in a touch control manner. However, the present disclosure further provides a method of controlling the camera component by a designated face region. Therefore, in an example, a new camera control mode may be constructed for allowing a designated face region to control a camera. For example, the new camera control mode may be referred to as a mode of controlling a camera with actions. However, a precondition of obtaining the event data collected by the DVS collecting circuit at step 102 not only requires the terminal device to perform photographing with the camera component, but also requires the mode of controlling the camera with actions to be started. Correspondingly, step 102 may be: in a case that the terminal device performs photographing with the camera component and the mode of controlling the camera with actions is started, obtaining the event data collected by the DVS collecting circuit. When the user does not need to control the camera according to the designated face region, the mode of controlling the camera with actions may be off, thereby avoiding wasting resources since the DVS collecting module collects the event data in real time.

The event data may be event data collected by the DVS collecting circuit at a same moment, or may also be event data collected at successive moments (a plurality of moments). After the event data collected by the DVS collecting circuit is obtained, the action of the designated face region within the collection range of the DVS collecting circuit may be identified according to the event data.

The designated face region may be one region or a plurality of regions on a face. In an example, by taking a plurality of regions on a face as an example, the action of the designated face region may be a facial action, such as an expression action or a non-expression action. The expression action may be change actions of eye muscles, face muscles or mouth muscles and so on when different emotional states are expressed. For example, the expression action may be a facial action to express an emotion, such as excitement, favor, surprise, pain, fear, humiliation, disgust and anger. The non-expression action may be an action such as opening a mouth, shutting a mouth, and the like.

In this example, the camera component is controlled by the facial actions. Since there are many types of facial actions, the camera component may be controlled to perform a plurality of target operations.

In another example, considering flexibility of an eye, the designated face region may be an eye. The action of the eye may be one or more of a pupil action, an eyeball action and an eyelid action. In a broad sense, the action of eye may further include an eyebrow action. For example, the pupil may dilate or contract, the eyeball may move or rotate in different orientations, the eyelid may open and close. Further, an eye expression action representing a designated emotion may also be completed according to the eyelid, the eyeball, the eyebrow and the like. Illustratively, the target action corresponding to the designated face region may include one or more of: at least one double eye-blink, one eye open and one eye closed, an eyeball resetting after moving to a designated direction and an eye expression action representing a designated emotion. The eyeball resetting after moving to the designated direction may refer to, for example, resetting after moving upward or resetting after moving leftward, or the like. The eye expression action may be an expression such as frowning plus glaring.

In this example, controlling the camera component by the action of the eye reduces identification contents and at the same time, the action of the eye is easily completed by the control object, thereby improving user control experiences.

When the designated face region changes, the event data of the designated face region may be obtained. Therefore, the action of the designated face region within the collection range of the DVS collecting circuit may be identified according to the event data. Illustratively, the action of the designated face region within the collection range of the DVS collecting circuit may be identified according to the event data corresponding to the same time stamp information. By taking the designated face region as an eye, an eye region may be firstly identified according to the event data corresponding to the same time stamp information, and then, the action of the eye may be identified from the eye region. It may be understood that the event data under one or more time stamps may be required in the identification process, which is not limited herein.

In an example, the action of the designated face region in the event data may be identified by using a pre-trained action identification model. The action identification model may be a model obtained by training samples with labels. The training samples may include general samples and dedicated samples. The general samples are images when an action is performed by the designated face region without distinguishing the object, and the dedicated samples may be event data when an action is performed by the designated face region of the control object of the present device or terminal. For example, a dedicated samples collection service is provided. For example, the target action includes an eye blink. If the user is prompted to blink an eye, the event data when the control object blinks the eye is collected and recorded by the DVS collecting circuit. Illustratively, considering that the designated face regions of different persons (control objects) may be different, a general action identification model may be firstly obtained by training with the general samples. For each device, a dedicated action identification model may also be obtained by performing enhanced training for the general action identification model with the dedicated samples of the control object, thereby increasing an identification accuracy.

It may be understood that the action of the designated face region within the collection range of the DVS collecting circuit may also be identified in other manners, which are not described in detail herein.

In an example, regarding the timing of identifying the action, after the event data collected by the DVS collecting circuit is obtained, the action of the designated face region within the collection range of the DVS collecting circuit may be identified according to the event data. In some application scenarios, there may be a time interval from starting the mode of controlling the camera with actions to actually controlling the camera, and performing continuous action identifications at this time interval will result in resource waste. In view of this, in another example, action identification may be triggered (or started) after it is determined that a user has an intention to control the camera. In an example, it may be determined whether the user has an intention to control the camera according to whether a visual focus is located in a predetermined controllable region. Illustratively, before the action of the designated face region within the collection range of the DVS collecting circuit is identified according to the event data, the method further includes:

determining position information of the visual focus of the control object according to the event data collected by the DVS collecting circuit; and determining that the visual focus is located within the predetermined controllable region according to the position information, where the controllable region is configured according to an operable region of the terminal device.

The event data may be event data collected by the DVS collecting circuit at the same moment, or may also be event data collected at successive moments (a plurality of moments). The visual focus located within the controllable region may be used to represent that the control object has an intention to control the camera. The intention may be understood as a primary intention, if classified by level. The visual focus may be a focus point of a gaze of the control object, which may also be referred to as a gaze point. In an example, the position information of the visual focus may be determined according to spatial position information of the eye relative to the terminal device and a gaze direction of the eye. Illustratively, determining the position information of the visual focus according to the event data collected by the DVS collecting circuit may include:

determining a position of the eye of the control object in the event data collected by the DVS collecting circuit and determining spatial position information of the eye relative to the terminal device according to a distance from the eye to the DVS collecting circuit and position information of the DVS collecting circuit on the terminal device;

determining the gaze direction of the eye by performing gaze direction identification based on the event data; and determining the position information of the visual focus of the control object according to the spatial position information and the determined gaze direction.

The event data may include information such as a coordinate position of the pixel unit of which a detected brightness is changed. Therefore, the position of the eye may be determined according to the coordinate position of the pixel unit indicating the eye.

The distance from the eye to the DVS collecting circuit may be determined according to depth information of the pixel unit indicating the eye. In an example, if the terminal device includes a monocular photographing module, the distance from the eye to the DVS collecting circuit may be determined by a Depth From Focus (DFF) method. In another example, if the terminal device includes a plurality of photographing modules, the distance from the eye to the DVS collecting circuit may be determined by using a binocular camera. For example, if the DVS collecting circuit is disposed on the surface where the screen is located, the DVS collecting circuit and the front camera may form the binocular camera component, and thus the distance from the eye to the DVS collecting circuit may be determined by using the binocular camera component. It may be understood that a specific determination manner is similar to that of determining a distance with an ordinary binocular camera, which is not described herein. In addition, the distance from the eye to the DVS collecting circuit may also be determined by other methods, which are not described in detail herein.

The position information of the DVS collecting circuit on the terminal device is fixed, and may be pre-stored.

After the position of the eye, the distance from the eye to the DVS collecting circuit and the position information of the DVS collecting circuit on the terminal device are determined, the spatial position information of the eye relative to the terminal device may be obtained. For example, spatial coordinates of the eye and the terminal device may be determined by establishing a three-dimensional spatial coordinate system.

The gaze direction, also known as the staring direction, may be a direction determined based on a pupil. Since there is data representing the eye in the event data, the gaze direction of the eye may be determined by performing gaze direction identification based on the event data. In an example, the gaze direction may be passively determined. For example, the event data of the eye is collected by the DVS collecting circuit, an eyeball stereoscopic modelling is performed based on the obtained event data to determine the position of the pupil and then the gaze direction is determined according to the position of the pupil. In another example, the gaze direction may be actively determined. For example, an active light source emitting apparatus is provided. Light is emitted to the eye by the active light source emitting apparatus (e.g., by a point light source) and reflected in the eye. The event data of the eye region in this scenario is collected with the DVS. The gaze direction is determined according to the position of a reflection point of the point light source in the eye.

It is to be understood that the gaze direction of the eye may also be determined in other manners, which are not described in detail herein.

In this example, the position information of the visual focus may be determined according to the spatial position information of the eye relative to the terminal device and the gaze direction of the eye.

After the position information of the visual focus is determined, whether the visual focus is located within the predetermined controllable region may be determined. When it is determined that the visual focus located is within the controllable region, step 104 may be performed; and otherwise, a return is made to continue the step of determining the position information of the visual focus according to the event data collected by the DVS collecting circuit.

The predetermined controllable region may be determined based on whether the visual focus falling within the controllable region reflects an intention of the control object to control the camera. The operable region of the terminal device may include a touchable operation region and/or a button operation region, and the like. In an example, when the control object faces towards the operable region of the terminal device, it may be considered that the control object has an intention to control the camera, and the controllable region may be configured according to the operable region of the terminal device. Configuration of the controllable region according to the operable region of the terminal device may be set according to requirements. Illustratively, the controllable region may be a region where the control object is desired to control the camera with a designated face region. For example, the controllable region may be a full screen region, or may also be a partial screen region, or may even be a boundary region of the terminal device, and the like. For example, in a photographing scenario, to avoid a case that touch controls in the upper and lower menu bars of a photographing interface are mistaken to be operated, the controllable region may be a view-finding frame region excluding the region where the menu bars are located on the screen. In the view-finding frame region, operations such as image zooming-in and zooming-out and focusing may be performed according to the designated face region. However, in some scenarios where it is desired to control the touch controls in the menu bars according to the designated face region, the controllable region may be a region where the full screen is located.

In this example, the action identification is triggered when it is determined that the visual focus is located within the predetermined controllable region, thereby avoiding resource waste resulted from continuous action identifications.

In an example, to further prevent the action of the designated face region from erroneously controlling the camera, whether a subsequently identified action is valid may be determined based on whether a designated awakening action is detected. The camera component is controlled to perform the target operation corresponding to the target action in a case of valid action. A condition that the target action is the valid action is that a designated awakening action is identified before the target action is identified. Correspondingly, the target action is the valid action. The method further includes:

after the designated awakening action is identified according to the event data collected by the DVS collecting circuit, determining the action of the designated face region identified from the event data collected by the DVS collecting circuit as the valid action, where the designated awakening action is a pre-designated action for representing an intention of the control object to control the camera according to the action of the designated face region.

An identified designated awakening action may be used to represent that the control object has an intention to control the camera according to the action of the designated face region. If classified by level, the intention represented by the identified designated awakening action is stronger than that represented by the visual focus within the controllable region and thus may be classified as a deep intention. The designated awakening action may be a pre-designated action, may be a default action, or may be an action pre-configured by the control object. For example, the designated awakening action may be two successive eye blinks, and the like. After the designated awakening action is detected, whether the target action is identified may be determined by performing action identification for the event data newly obtained from the DVS collecting circuit.

In this example, whether the subsequently identified action is valid is determined based on whether the designated awakening action is identified, thereby avoiding erroneously controlling the camera due to an accidental performance of a target action.

Further, a valid period of the designated awakening action may also be set, and the target action is an action identified within a preset time period after the designated awakening action is identified. The target action is determined as valid when the target action is identified within the preset time period after the designated awakening action is identified. The preset time period may be set according to requirements, for example, may be set to 3 s, 10 s, or the like. In a scenario where the designated awakening action is identified before the target action is identified each time, the preset time period may be set to a relatively small value. In a scenario where a plurality of subsequent actions are all determined as valid actions after the designated awakening action is identified, the preset time period may be set to a relatively large value.

The control object may be an object controlling the terminal device. For example, the control object may be a designated object (may also be referred to as an object with a permission), or may also be a non-designated object (an object operating the terminal device currently without considering whether the object has a permission). In a practical application, there may be a case that a plurality of objects exist within the collection range of the DVS collecting circuit. In an example, the control object may be an object with a permission. The object with a permission may be identified from collected human face images, and the event data of human eyes of the object with a permission is obtained. For example, it is agreed that only a device owner has a permission of controlling the camera with an action. In another example, to realize controllability of the control object, before the action of the designated face region is identified according to the event data, the method further includes:

outputting prompt information of selecting a control object upon identifying at least two human faces; and taking a selected object as the control object based on a selection instruction triggered by the user, where the designated face region is a designated face region of the selected object.

Human face identification may be performed by using images collected by the camera component, or may also be performed by using the event data collected by the DVS collecting circuit. The selected object may be a control object selected by the user based on the prompt information.

In this example, the selectivity of the control object may be improved by providing the prompt information of selecting a control object for the user to select.

When the target action is identified, the camera component may be controlled to perform the target operation corresponding to the target action.

In an example of the present disclosure, a mapping relationship between the target actions and the target operations may be pre-established, and different target actions may trigger different target operations. Illustratively, a mapping relationship between target actions and control instructions may be pre-constructed. The target action is used to instruct the terminal device to perform the target operation by a control instruction. When the target action is identified, the camera component is controlled to perform a corresponding target operation according to the control instruction obtained from the identified target action.

The target operation may be executed by the camera component. For example, the target operation may include focusing, zooming image, confirming photographing (pressing a shutter), turning on a flashlight, turning off a flashlight, enabling a High-Dynamic Range (HDR), disabling an HDR, and the like. For example, two successive eye blinks represent pressing the shutter, that is, confirming photographing. The eyeball resetting after moving leftward represents turning on the flashlight and the eyeball resetting after moving rightward represents turning off the flashlight.

In some target operations, corresponding adjustment operations may be performed by relying on a point on a screen. In view of this, the camera component is controlled to perform the target operation corresponding to the target action for the region where the visual focus is located on the screen. A focusing adjustment/zooming adjustment is taken as an example. When the target action is identified, controlling the camera component to perform the target operation corresponding to the target action includes:

upon the identification of the target action corresponding to the focusing adjustment or zooming adjustment, controlling the camera component to perform a focusing operation or zooming operation, where the performed focusing operation or zooming operation is same as a focusing operation or zooming operation triggered by touching the region where the visual focus is located on the screen, and the visual focus is a point gazed by the control object.

In this example, the camera component may be controlled to perform the focusing operation or zooming operation based on the visual focus and the action of the designated face region, thereby performing more types of target operations.

In another example, there may be a case that the control object has an intention to touch a screen position corresponding to the visual focus. Therefore, one type of dedicated actions may be used to indicate that the user has such requirements. In other words, the dedicated actions may be identified by the terminal, which may generate control instructions to control the terminal. The method further includes: where the target action is an eye action and the eye action is a designated action indicating a control manner, and the time when the control object gazes a same position of the terminal device exceeds a preset time threshold, controlling the camera component to perform an operation corresponding to a designated control instruction, where the designated control instruction is same as an instruction triggered by touching, with the determined control manner, a position gazed by the control object on the terminal device; and the control manner includes any one of a single click, a double click and a long press.

The position gazed by the control object may be determined according to the position information of the visual focus of the control object, and the position gazed by the control object may also be a button in a camera interface. For example, the current interface of the terminal device may include a plurality of controls such as filter and beautifier, and the designated action may be a pre-agreed action. For example, the designated action may include opening a mouth, opening one eye while closing the other eye, or rotating an eye, or the like. When a time when the control object gases a target control of the current interface exceeds a time threshold and a designated action indicating a single click is identified, the camera component may be controlled to perform the operation same as the operation triggered by touching the target control.

In this example, point-touching the control on the screen may also be replaced with a combination of the action of the designated face region and the visual focus.

In a practical application, when a photographed object includes the control object, if the camera component is controlled to perform the target operation corresponding to the target action immediately after the target action is identified, there may be a case that an imaging result is not a result desired by the control object because the control object dos not prepare well. In view of this, a delay adjustment mechanism is further configured. Correspondingly, when the target action is identified, controlling the camera component to perform the target operation corresponding to the target action may include:

performing a countdown (e.g., a reminder) after the target action is identified; and controlling the camera component to perform the target operation corresponding to the target action after the countdown ends.

In this example, the countdown may be a sound reminding or a display reminding, which may be specifically configured according to requirements. For example, a countdown digit or a countdown progress bar, or the like may be displayed in a picture to remind the user that the target operation corresponding to the target action will be performed after the countdown ends.

Different technical features in the above examples may be arbitrarily combined as long as no conflict or contradiction exists in the combinations of the technical features, which is not described in detail herein due to limited space. Therefore, any combination of different technical features in the above examples may also be encompassed in the scope of the present disclosure.

Descriptions are made below with reference to one of the combinations.

Figure 3A:
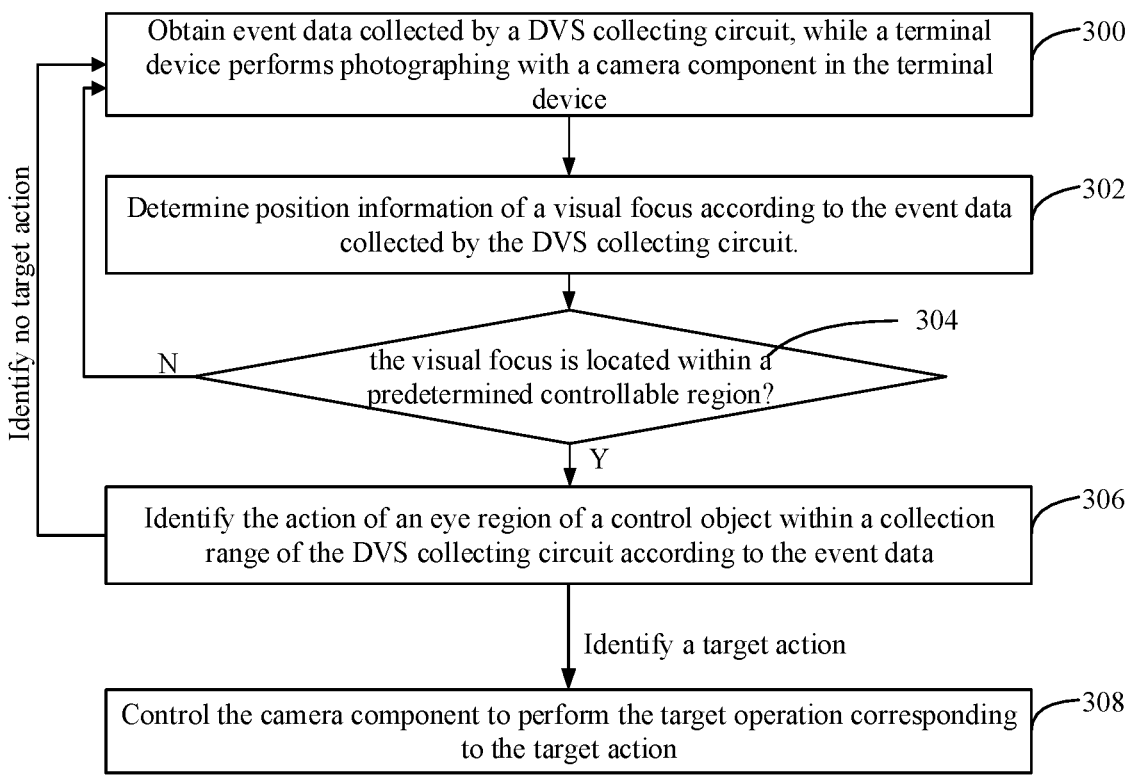
FIG. 3A is a flowchart illustrating another method of controlling a camera according to an example of the present disclosure.

FIG. 3A is a flowchart illustrating another method of controlling a camera according to an example of the present disclosure. The method is applied to a terminal device, and the terminal device includes a DVS collecting circuit. The method includes the following steps 300-308.

At step 300, while the terminal device performs photographing with a camera component in the terminal device, event data collected by the DVS collecting circuit is obtained.

At step 302, position information of a visual focus is determined according to the event data collected by the DVS collecting circuit.

After the camera component is started, the DVS begins to detect a human eye region, analyze event data to determine eyeball orientation and pose information, and further determine position information of the visual focus. The DVS is a dynamic event sensor that may perform good tracking for a moving object such as an eyeball due to features of a high frame rate and high dynamics. With the high frame rate, the sensor may determine eye information more frequently, analyze the action of the eye region more carefully and capture a tiny change of the eye region timelier. Due to the high dynamics and good performance under dark light, the sensor may monitor the eye region well under strong light, dark light or backlight.

At step 304, whether the visual focus is located within a predetermined controllable region is determined according to the position information. If yes, step 306 is performed; if not, a return is made to perform step 300.

The controllable region is configured according to an operable region of the terminal device, and the visual focus located within the controllable region may indicate that the control object has intention to control the camera component.

At step 306, the action of the eye region of the control object within the collection range of the DVS collecting circuit is identified according to the event data. When a target action is identified, step 308 is performed; when no target action is identified, a return is made to perform step 300.

When the visual focus is located in the controllable region, the action of the eye region, such as an action of the eyeball or an expression of the eye region may be further determined and analyzed. If the target action is identified, control information for controlling the camera component is generated based on the captured information of the target action according to a set interaction logic, so as to control the camera component to perform a target operation corresponding to the target action.

At step 308, the camera component is controlled to perform the target operation corresponding to the target action.

The detailed contents in FIG. 3A are the same as those in FIG. 1, which are not described in detail herein.

In this example, the DVS has inherent advantages in pose identification and sensing, and action capture of a moving object and therefore may perform more accurate and efficient identification for information such as orientation information and action information of the eye. The DVS has features of a high frame rate and high dynamics. With the high frame rate, the sensor may determine eye information more frequently, analyze the action of the eye region more carefully and capture a tiny change of the eye region timelier. Due to the high dynamics and good performance under dark light, the sensor may monitor the eye region well under strong light, dark light or backlight. The DVS is better adapted to various extreme light environments, and it directly performs corresponding target operations for the camera according to different actions of the eye region. In this case, a remote operation may be realized by relying on the eye region without any manual control, expanding the use scenarios of the camera in the terminal device. The control process is more direct and concise, learning costs of the users are reduced through a visual operation manner conforming to human intuitions, and operation experiences of the camera in the terminal device are improved.

Figure 3B:
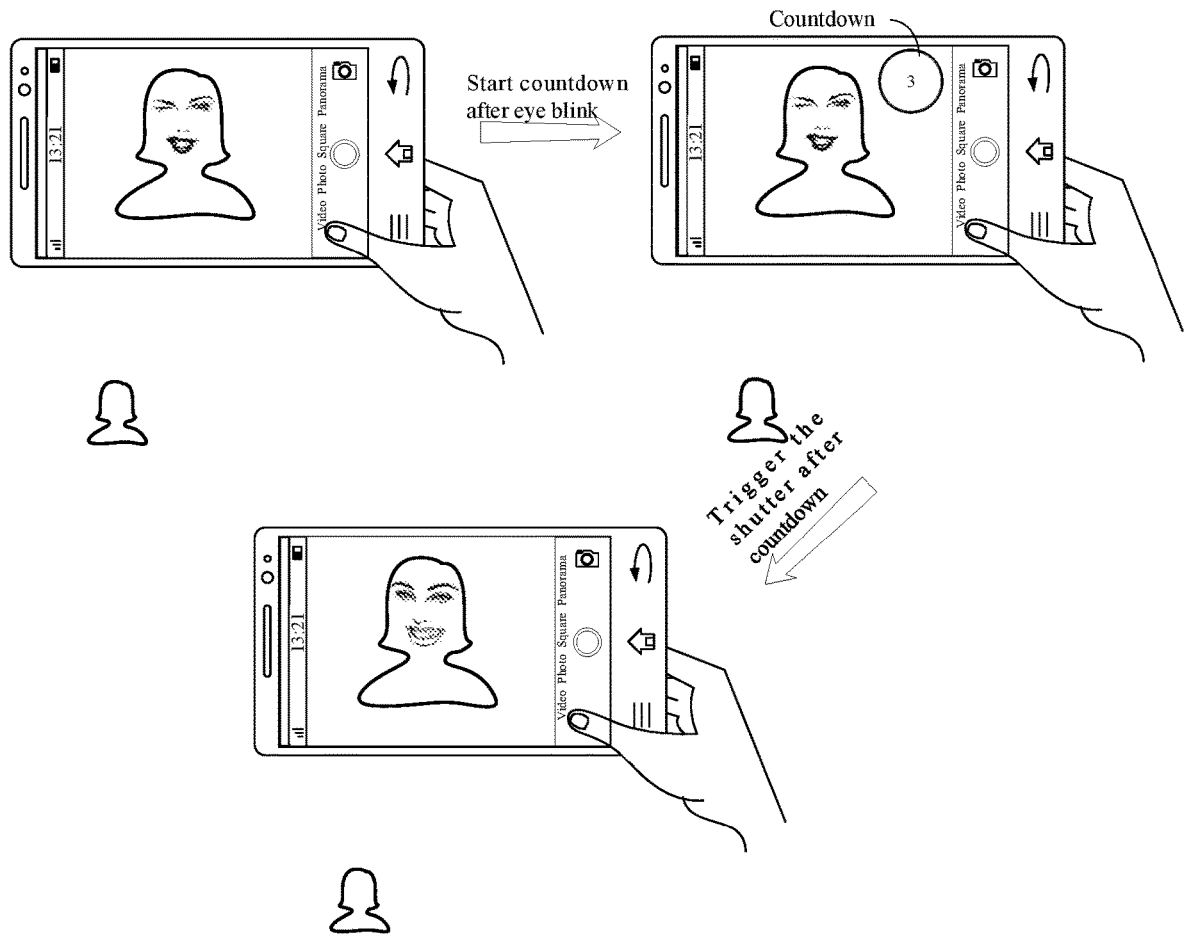
FIG. 3B is a schematic diagram illustrating an application scenario of a method of controlling a camera according to an example of the present disclosure.

Descriptions are made below with a specific application scenario. FIG. 3B is a schematic diagram illustrating an application scenario of a method of controlling a camera according to an example of the present disclosure. In this scenario, an example in which a user takes self-photographing by stretching an arm is provided. A control object triggers an operation of pressing shutter through an eye region action of a single eye blink. After the action of the single eye blink is identified by the DVS, a countdown is started with digits counting down so that the control object may adjust an expression or action during the countdown period, and the shutter is triggered after the countdown ends. In this way, photographing is completed. In this example, the camera is controlled remotely through eye region action, expanding the use scenario of the camera.

Corresponding to the above examples of the method of controlling a camera, the present disclosure further provides examples of an apparatus for controlling a camera, a device to which the apparatus is applied and a storage medium.

Figure 4:
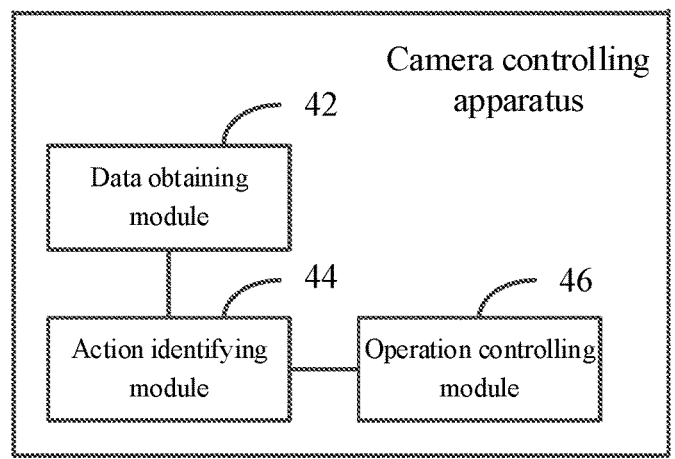
FIG. 4 is a block diagram illustrating an apparatus for controlling a camera according to an example of the present disclosure.

FIG. 4 is a block diagram illustrating an apparatus for controlling a camera according to an example of the present disclosure. The apparatus is applicable to a terminal device, and the terminal device includes a DVS collecting circuit. The apparatus includes:

a data obtaining module 42, configured to obtain event data collected by the DVS collecting circuit where the terminal device performs photographing with a camera component in the terminal device;

an action identifying module 44, configured to identify an action of a designated face region of a control object within a collection range of the DVS collecting circuit according to the event data; and an operation controlling module 46, configured to control the camera component to perform a target operation corresponding to a target action of the designated face region upon identification of the target action.

In another optional example, the designated face region is an eye region.

In another optional example, the target action includes one or more of: at least one double eye blink, one eye open and one eye closed, an eyeball resetting after moving to a designated direction or an eye expression action representing a designated emotion.

Figure 5:
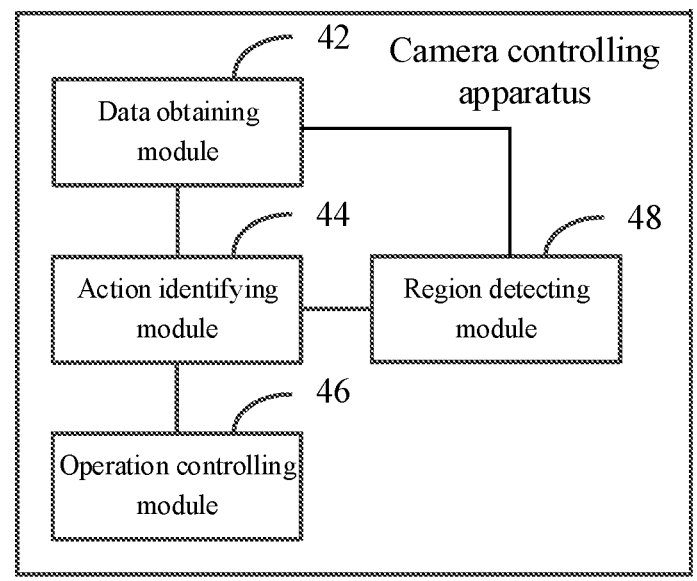
FIG. 5 is a block diagram illustrating another apparatus for controlling a camera according to an example of the present disclosure.

In another optional example, FIG. 5 is a block diagram illustrating another apparatus for controlling a camera according to an example of the present disclosure. Based on the above example shown in FIG. 4, the apparatus in this example further includes a region detecting module 48. The region detecting module 48 is configured to:

determine position information of a visual focus of the control object according to the event data collected by the DVS collecting circuit before the action of the designated face region is identified according to the event data; and determine that the visual focus is located within a predetermined controllable region according to the position information, where the controllable region is configured according to an operable region of the terminal device.

In another optional example, the region detecting module 48 is specifically configured to:

determine a position of an eye region of the control object in the event data collected by the DVS collecting circuit and determine spatial position information of the eye region relative to the terminal device according to a distance from the eye region to the DVS collecting circuit and position information of the DVS collecting circuit on the terminal device;

determine a gaze direction of the eye region by performing gaze direction identification based on the event data; and determine the position information of the visual focus of the control object according to the spatial position information and the determined gaze direction.

In another optional example, the target action is an action identified within a preset time period after a designated awakening action is identified.

Figure 6:
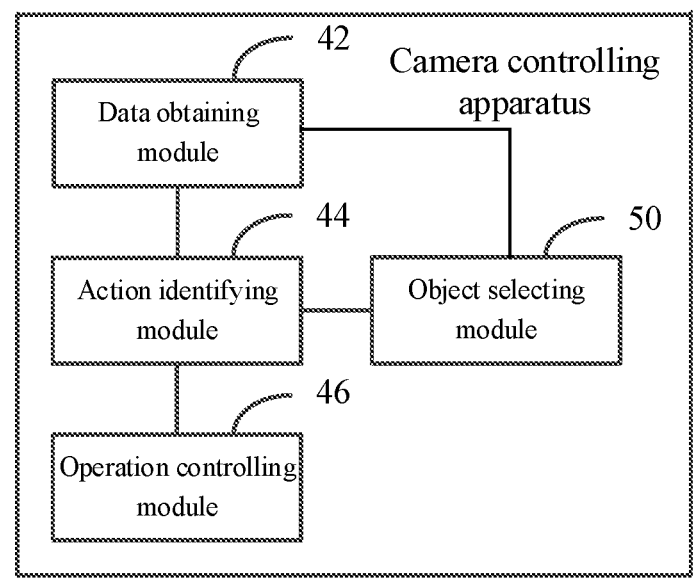
FIG. 6 is a block diagram illustrating still another apparatus for controlling a camera according to an example of the present disclosure.

FIG. 6 is a block diagram illustrating still another apparatus for controlling a camera according to an example of the present disclosure. In another optional example, based on the above example shown in FIG. 4, the apparatus further includes an object selecting module 50. The object selecting module 50 is configured to:

upon identifying at least two human faces before the action of the designated face region is identified according to the event data, output prompt information of selecting the control object; and take a selected object as the control object based on a selection instruction triggered by a user, where the designated face region is a designated face region of the selected object.

In an optional example, the target operation includes a focusing adjustment or zooming adjustment, and the operation controlling module 46 is configured to:

control the camera component to perform a focusing operation or zooming operation upon the identification of the target action corresponding to the focusing adjustment or zooming adjustment, where the performed focusing operation or zooming operation is same as a focusing operation or zooming operation triggered by touching a region of a visual focus on a screen of the terminal device, and the visual focus is a point gazed by the control object.

In an optional example, the operation controlling module 46 is configured to:

perform a countdown after the target action is identified; and control the camera component to perform the target operation corresponding to the target action after the countdown ends.

In an optional example, the operation controlling module 46 is further configured to:

where the target action is an eye action designated to indicate a control manner, and a time when the control object stares a same position of the terminal device exceeds a preset time threshold, control the camera component to perform an operation corresponding to a designated control instruction, where the designated control instruction is same as an instruction triggered by touching, with the control manner, the position gazed by the control object on the terminal device, and the control manner includes any one of a single click, a double click and a long press.

Correspondingly, the present disclosure further provides a terminal device including a DVS collecting circuit, one or more processors, and a memory configured to store instructions executable by the processors, where, upon execution of the instructions, the one or more processors are configured to: obtain event data collected by the DVS collecting circuit, where the terminal device performs photographing with a camera component in the terminal device; identify an action of a designated face region of a control object within a collection range of the DVS collecting circuit according to the event data; and upon identification of a target action of the designated face region, control the camera component to perform a target operation corresponding to the target action.

Correspondingly, the present disclosure further provides a computer readable storage medium storing instructions therein, where, when the instructions are executed by one or more processors, the instructions cause the processors to: obtain event data collected by a DVS collecting circuit of a terminal device, wherein the terminal device performs photographing with a camera component in the terminal device; identify an action of a designated face region of a control object within a collection range of the DVS collecting circuit according to the event data; and upon identification of a target action of the designated face region, control the camera component to perform a target operation corresponding to the target action.

In the examples of the present disclosure, the form of computer program products implemented on one or more storage mediums containing program codes (or instructions) including but not limited to a magnetic disk memory, a CD-ROM, and an optical memory and so on may be adopted. The computer available storage medium includes permanent, non-permanent, mobile and non-mobile media, which can realize information storage by any method or technology. The information may be computer readable instructions, data structures, program modules and other data. The examples of the computer storage medium include but not limited to: a Phase change Random Access Memory (PRAM), a Static Random Access Memory (SRAM), a Dynamic Random Access Memory (DRAM), and other types of RAMs, a Read-Only Memory (ROM), an Electrically-Erasable Programmable Read-Only Memory (EEPROM), a Flash Memory, or other memory technology, a CD-ROM, a digital versatile disc (DVD) or other optical storages, cassette type magnetic tapes, magnetic disk storages or other magnetic storage devices or other non-transmission mediums for storing information accessible by computing devices.

Details of the implementation process of the functions and effects of different modules in the above apparatus may be seen from the implementation process of corresponding steps in the above method, which will not be described herein.

Since the apparatus examples substantially correspond to the method examples, a reference may be made to the descriptions of the method examples for the related part. The apparatus examples described above are merely illustrative, where the modules described as separate members may be or not be physically separated, and the members displayed as modules may be or not be physical units, i.e., may be located in one place, or may be distributed to a plurality of network modules. Part or all of the modules may be selected according to actual requirements to implement the objectives of the solutions in the present disclosure. Those of ordinary skill in the art may understand and carry out them without creative work.

Figure 7:
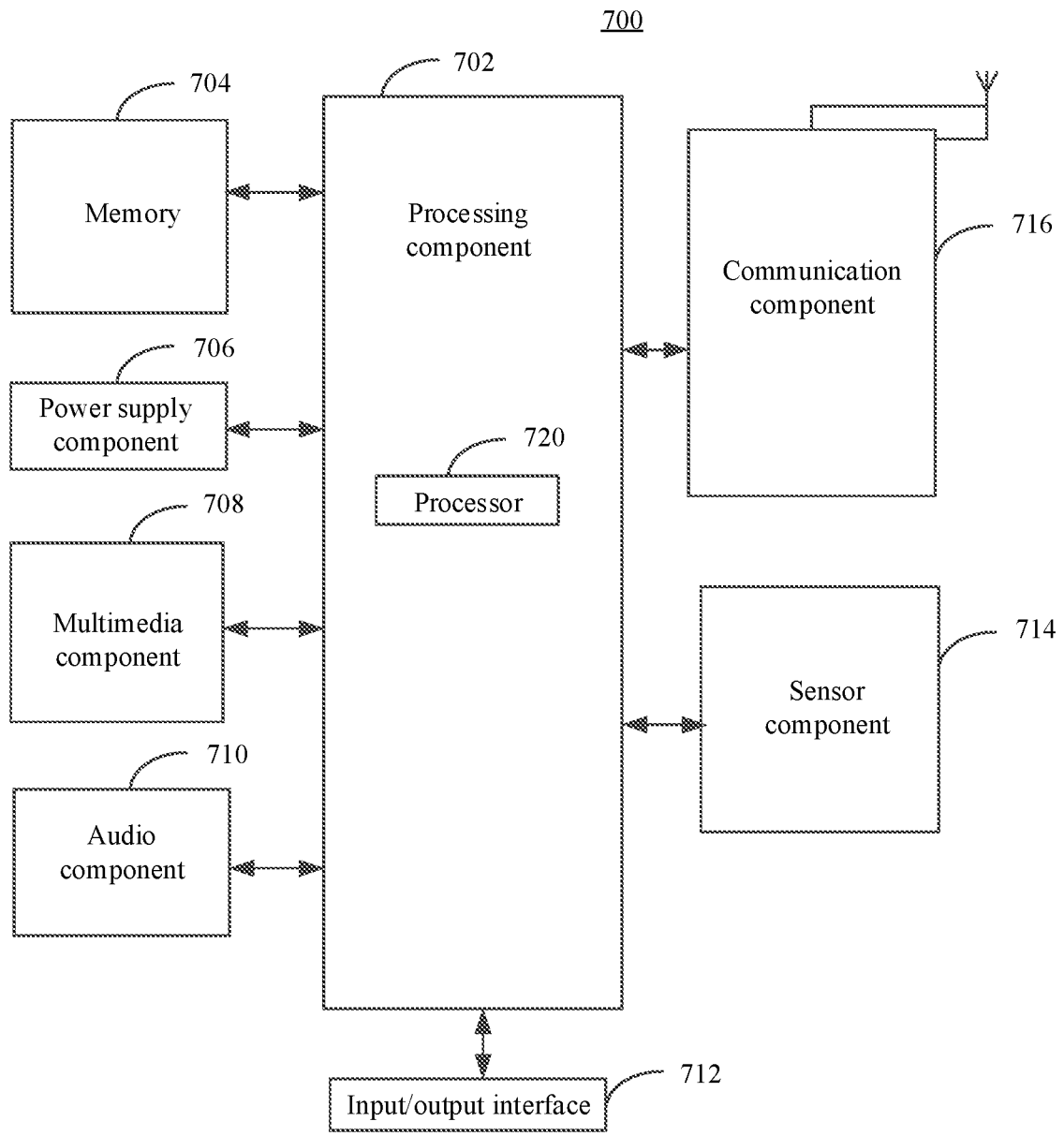
FIG. 7 is a block diagram illustrating an apparatus for controlling a camera according to an example of the present disclosure.

FIG. 7 is a block diagram illustrating an apparatus for controlling a camera according to an example of the present disclosure. The apparatus 700 may be a terminal including a DVS collecting circuit, such as a mobile phone, a tablet computer, a digital broadcast terminal, a message transceiving device, a game console, a tablet device, a medical device, a fitness device, and a personal digital assistant.

As shown in FIG. 7, the apparatus 700 may include one or more of the following components: a processing component 702, a memory 704, a power supply component 706, a multimedia component 708, an audio component 710, an input/output (I/O) interface 712, a sensor component 714, and a communication component 716.

The processing component 702 usually controls overall operations of the apparatus 700, such as operations relating to display, a telephone call, data communication, a camera operation and a recording operation. The processing component 702 may include one or more processors 720 for executing instructions to complete all or a part of steps of the above method. Further, the processing component 702 may include one or more modules to facilitate interaction between the processing component 702 and other components. For example, the processing component 702 may include a multimedia module to facilitate the interaction between the multimedia component 708 and the processing component 702.

The memory 704 is configured to store different types of data to support operations at the apparatus 700. Examples of such data include instructions, contact data, phonebook data, messages, pictures, videos, and so on for any application or method that operates on the apparatus 700. The memory 704 may be implemented by any type of volatile or non-volatile storage devices or a combination thereof, and the memory 704 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 706 supplies power for different components of the apparatus 700. The power supply component 706 may include a power supply management system, one or more power supplies, and other components associated with generating, managing and distributing power for the apparatus 700.

The multimedia component 708 includes a screen providing an output interface between the apparatus 700 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 708 may include a front camera and/or a rear camera. When the apparatus 700 is in an operation mode, such as a shooting mode or a video mode, the front camera and/or the rear camera may receive external multimedia data. Each of the front camera and the rear camera may be a fixed optical lens system or may be capable of focal length and optical zoom.

The audio component 710 is configured to output and/or input an audio signal. For example, the audio component 710 includes a microphone (MIC). When the apparatus 700 is in an operating mode, such as a call mode, a recording mode and a voice recognition mode, the microphone is configured to receive an external audio signal. The received audio signal may be further stored in the memory 704 or sent via the communication component 716. In some examples, the audio component 710 further includes a speaker for outputting an audio signal.

The I/O interface 712 provides an interface between the processing component 702 and a peripheral interface module. The above peripheral interface module may be a keyboard, a click wheel, a button, or the like. These buttons may include but not limited to, a home button, a volume button, a start button and a lock button.

The sensor component 714 includes one or more sensors for providing a state assessment in different aspects for the apparatus 700. For example, the sensor component 714 may detect an on/off state of the apparatus 700 and relative locations of components. For example, the components are a display and a keypad of the apparatus 700. The sensor component 714 may also detect a position change of the apparatus 700 or a component of the apparatus 700, presence or absence of a contact of a user on the apparatus 700, an orientation or acceleration/deceleration of the apparatus 700, and a temperature change of apparatus 700. The sensor component 714 may include a proximity sensor configured to detect presence of a nearby object without any physical touch. The sensor component 714 may further include an optical sensor, such as a CMOS or CCD image sensor used in an imaging application. In some examples, the sensor component 714 may further include an acceleration sensor, a gyroscope sensor, a magnetic sensor, a pressure sensor, or a temperature sensor.

The communication component 716 is configured to facilitate wired or wireless communication between the apparatus 700 and other devices. The apparatus 700 may access a wireless network based on a communication standard, such as WiFi, 2G or 3G, or a combination thereof. In an example, the communication component 716 receives a broadcast signal or broadcast related information from an external broadcast management system via a broadcast channel. In an example, the communication component 716 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 700 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

In an example, there is further provided a non-transitory computer readable storage medium including instructions, such as the memory 704 including instructions. The above instructions may be executed by the processor 720 of the apparatus 700 to complete the above method. For example, the non-transitory computer readable storage medium may be a Read-Only Memory (ROM), a Random Access Memory (RAM), a CD-ROM, a magnetic tape, a floppy disk and an optical data storage device, etc.

When the instructions in the storage medium are executed by the processor 720, the apparatus 700 is caused to perform a method of controlling a camera. The method includes:

obtaining event data collected by a DVS collecting circuit when a terminal device performs photographing with a camera component;

identifying an action of a designated face region of a control object within a collection range of the DVS collecting circuit according to the event data; and controlling the camera component to perform a target operation corresponding to a target action upon identifying the target action.

After considering the specification and practicing the present disclosure, the persons of skill in the art may easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the art not disclosed in the present disclosure. The specification and examples herein are intended to be illustrative only.

It is to be understood that the present disclosure is not limited to the precise structures described above and shown in the accompanying drawings and may be modified or changed without departing from the scope of the present disclosure.

The foregoing disclosure is merely illustrative of examples of the present disclosure but not intended to limit the present disclosure, and any modifications, equivalent substitutions and adaptations thereof made within the spirit and principles of the present disclosure shall be encompassed in the scope of protection of the present disclosure.

What is claimed is:

1. A method of controlling a camera, the method being applicable to a terminal device, the terminal device comprising a Dynamic Vision Sensor collecting circuit, wherein the method comprises:

obtaining event data collected by the DVS collecting circuit, while the terminal device performs photographing with a camera component in the terminal device;

determining position information of a visual focus of a control object according to the event data;

determining whether the control object has an intention to control the camera component based on whether the visual focus is located within a controllable region according to the position information, wherein the controllable region is a region on the terminal device and controlled by an action of a designated face region of the control object;

triggering an action identification to identify, by a pre-trained action identification model after determining that the control object has an intention to control the camera component, the action of the designated face region of the control object within a collection range of the DVS collecting circuit according to the event data, wherein the control object comprises an object with a permission that controls the terminal device; and upon identification of a target action of the designated face region, controlling the camera component to perform a target operation corresponding to the target action;

wherein determining the position information of the visual focus of the control object according to the event data collected by the DVS collecting circuit comprises:

determining a position of an eye region of the control object in the event data collected by the DVS collecting circuit; wherein the event data comprises information of a coordinate position of a pixel unit of which a detected brightness is changed, the position of the eye region of the control object in the event data is determined according to a coordinate position of the pixel unit indicating the eye region;

determining spatial position information of the eye region relative to the terminal device according to the position of the eye region in the event data, a distance from the eye region to the DVS collecting circuit and position information of the DVS collecting circuit on the terminal device;

determining a gaze direction of the eye region by performing gaze direction identification based on the event data; and determining the position information of the visual focus of the control object according to the spatial position information and the determined gaze direction.

2. The method according to claim 1, wherein the designated face region is an eye region; and/or the target action comprises one or more of:
at least one double eye blink,
one eye open and one eye closed,
an eyeball resetting after moving to a designated direction, or
an eye expression action representing a designated emotion.

3. The method according to claim 1, wherein the target action is an action identified within a preset time period after a designated awakening action is identified.

4. The method according to claim 1, wherein the method further comprises:

upon identifying at least two human faces, outputting prompt information of selecting the control object; and taking a selected object as the control object based on a triggered selection instruction, wherein the designated face region is a designated face region of the selected object.

5. The method according to claim 1, wherein the target operation comprises a focusing adjustment or zooming adjustment, and upon the identification of the target action of the designated face region, controlling the camera component to perform the target operation corresponding to the target action comprises:

upon the identification of the target action corresponding to the focusing adjustment or zooming adjustment, controlling the camera component to perform a focusing operation or zooming operation, wherein the performed focusing operation or zooming operation is same as a focusing operation or zooming operation triggered by touching a region of a visual focus on a screen of the terminal device, and the visual focus is a point gazed by the control object.

6. The method according to claim 1, wherein upon the identification of the target action of the designated face region, controlling the camera component to perform the target operation corresponding to the target action comprises:

performing a countdown after the target action of the designated face region is identified; and controlling the camera component to perform the target operation corresponding to the target action after the countdown ends.

7. The method according to claim 1, wherein the designated face region is an eye region and the target action is an eye action designated to indicate a control manner; wherein the method further comprises:

upon identifying that a time when the control object gazes a same position of the terminal device exceeds a preset time threshold, controlling the camera component to perform an operation corresponding to a designated control instruction, wherein the designated control instruction is same as an instruction triggered by touching, with the control manner, the position gazed by the control object on the terminal device, and the control manner comprises any one of a single click, a double click and a long press.

8. The method according to claim 1, wherein the controllable region is a partial screen region of the terminal device.

9. A terminal device, comprising
a DVS collecting circuit,
one or more processors, and
a memory configured to store instructions executable by the processors,
wherein, upon execution of the instructions, the one or more processors are configured to:
obtain event data collected by the DVS collecting circuit, while the terminal device performs photographing with a camera component in the terminal device;
determine position information of a visual focus of a control object according to the event data;
determine whether the control object has an intention to control the camera component based on whether the visual focus is located within a controllable region according to the position information, wherein the controllable region is a region on the terminal device and controlled by an action of a designated face region of the control object;
trigger an action identification to identify, by a pre-trained action identification model after determining that the control object has an intention to control the camera component, the action of the designated face region of the control object within a collection range of the DVS collecting circuit according to the event data, wherein the control object comprises an object with a permission that controls the terminal device; and
upon identification of a target action of the designated face region, control the camera component to perform a target operation corresponding to the target action;
wherein the one or more processors are further configured to:
determine a position of an eye region of the control object in the event data collected by the DVS collecting circuit; wherein the event data comprises information of a coordinate position of a pixel unit of which a detected brightness is changed, the position of the eye region of the control object in the event data is determined according to a coordinate position of the pixel unit indicating the eye region;
determine spatial position information of the eye region relative to the terminal device according to the position of the eye region in the event data, a distance from the eye region to the DVS collecting circuit and position information of the DVS collecting circuit on the terminal device;
determine a gaze direction of the eye region by performing gaze direction identification based on the event data; and
determine the position information of the visual focus of the control object according to the spatial position information and the determined gaze direction.

10. The terminal device according to claim 9, wherein the designated face region is an eye region; and/or
the target action comprises one or more of:
at least one double eye blink,
one eye open and one eye closed,
an eyeball resetting after moving to a designated direction, or
an eye expression action representing a designated emotion.

11. The terminal device according to claim 9, wherein the target action is an action identified within a preset time period after a designated awakening action is identified.

12. The terminal device according to claim 9, wherein the one or more processors are further configured to:
upon identifying at least two human faces, output prompt information of selecting the control object; and
take a selected object as the control object based on a triggered selection instruction, wherein the designated face region is a designated face region of the selected object.

13. The terminal device according to claim 9, wherein the target operation comprises a focusing adjustment or zooming adjustment, and the one or more processors are further configured to:
upon the identification of the target action corresponding to the focusing adjustment or zooming adjustment, control the camera component to perform a focusing operation or zooming operation, wherein the performed focusing operation or zooming operation is same as a focusing operation or zooming operation triggered by touching a region of a visual focus on a screen of the terminal device, and the visual focus is a point gazed by the control object.

14. The terminal device according to claim 9, wherein the one or more processors are further configured to:
perform a countdown after the target action of the designated face region is identified; and
control the camera component to perform the target operation corresponding to the target action after the countdown ends.

15. The terminal device according to claim 9, wherein the designated face region is an eye region and the target action is an eye action designated to indicate a control manner; wherein the one or more processors are further configured to:
upon identifying that a time when the control object gazes a same position of the terminal device exceeds a preset time threshold, control the camera component to perform an operation corresponding to a designated control instruction, wherein the designated control instruction is same as an instruction triggered by touching, with the control manner, the position gazed by the control object on the terminal device, and the control manner comprises any one of a single click, a double click and a long press.

16. The terminal device according to claim 9, wherein the controllable region comprises a view-finding frame region in a photographing interface of the terminal device.

17. A non-transitory computer readable storage medium storing instructions therein, wherein, when the instructions are executed by one or more processors, the instructions cause the processors to:
obtain event data collected by a DVS collecting circuit of a terminal device, while the terminal device performs photographing with a camera component in the terminal device;
determine position information of a visual focus of a control object according to the event data;
determine whether the control object has an intention to control the camera component based on whether the visual focus is located within a controllable region according to the position information, wherein the controllable region is a region on the terminal device and controlled by an action of a designated face region of the control object;

trigger an action identification to identify, by a pre-trained action identification model after determining that the control object has an intention to control the camera component, the action of the designated face region of the control object within a collection range of the DVS collecting circuit according to the event data, wherein the control object comprises an object with a permission that controls the terminal device; and upon identification of a target action of the designated face region, control the camera component to perform a target operation corresponding to the target action;

the instructions further cause the processors to:

determine a position of an eye region of the control object in the event data collected by the DVS collecting circuit; wherein the event data comprises information of a coordinate position of a pixel unit of which a detected brightness is changed, the position of the eye region of the control object in the event data is determined according to a coordinate position of the pixel unit indicating the eye region;

determine spatial position information of the eye region relative to the terminal device according to the position of the eye region in the event data, a distance from the eye region to the DVS collecting circuit and position information of the DVS collecting circuit on the terminal device;

determine a gaze direction of the eye region by performing gaze direction identification based on the event data; and determine the position information of the visual focus of the control object according to the spatial position information and the determined gaze direction.

18. The non-transitory computer readable storage medium according to claim 17, wherein the designated face region is an eye region; and/or the target action comprises one or more of:
at least one double eye blink,
one eye open and one eye closed,
an eyeball resetting after moving to a designated direction, or
an eye expression action representing a designated emotion.

* * * * *